UNITED STATES PATENT OFFICE.

ERNEST SOLVAY, OF BRUSSELS, BELGIUM.

MANUFACTURE OF HYDROCHLORIC ACID.

SPECIFICATION forming part of Letters Patent No. 316,300, dated April 21, 1885.

Application filed May 20, 1884. (No specimens.) Patented in Belgium May 6, 1884, No. 65,071; in France May 6, 1884, No. 161,939, and in Germany May 7, 1884, No. 29,846.

*To all whom it may concern:*

Be it known that I, ERNEST SOLVAY, a Belgian subject, residing at Brussels, in the Kingdom of Belgium, have invented certain new and useful Improvements in Compositions for the Manufacture of Hydrochloric Acid; and I do hereby declare that the following is a full, clear, and exact description of the invention, which will enable others skilled in the art to which it appertains to make and use the same.

My invention relates to the process of decomposing chloride of calcium by means of vapor of water in presence of silica or silicious and aluminous substances.

I have found that when a mixture is composed in such relative proportions that the chloride of calcium contained therein corresponds to the required theoretical quantity of silica and alumina, a mass is obtained which softens when submitted to the temperature required to produce reaction, the matter agglomerates, and the apparatus with difficulty continues to work. If more silica and alumina be added, the desired infusibility is obtained; but then the material is no longer suited to the manufacture of cement, nor can it be subjected to any chemical treatment whatever, and the residuum is no longer so basic nor so soft. I reconcile these two contrary conditions by introducing into the mixture a sufficient quantity of the residuum of a previous operation, which residuum is infusible at the temperatures required to produce reaction. The new mixture thus resists heat sufficiently, although it contains quite as much lime as the mixture made in one single operation and containing the theoretical proportions of chloride of calcium and of silicious or aluminous substances.

As regards the silicious material to be used, the only one which has been proposed up to the present time is silicious sand; but when the difficulties of a manufacture on an industrial scale are considered it is found that sand is precisely what is not suited to it, for, being granular, it does not form, with chloride of calcium, a paste sufficiently binding. Thus the mixture obtained is more fusible, less homogenous, and cannot be decomposed completely, while at the same time it yields a bad residuum. I have therefore seriously studied this question and made considerable researches to discover what varieties of silica other than sand are suited to the purpose, and I have found that those species known generally as "silicious" clays are what ought to be used, such, for instance, as "ergeron," and also infusorial silica, fossil flour, or kieselguhr, &c. I have also found that silica when precipitated chemically is quite suitable for the process.

Having fully described my invention, what I desire to claim and secure by Letters Patent is—

1. The improved composition of matter for use in the manufacture of hydrochloric acid, consisting of chloride of calcium, silica, alumina, and the residuum from the manufacture of hydrochloric acid, substantially as described.

2. The improved composition of matter for use in the manufacture of hydrochloric acid, consisting of chloride of calcium, silicious clays, and the residuum from the manufacture of hydrochloric acid, substantially as described.

ERNEST SOLVAY.

Witnesses:
R. S. KIRKPATRICK,
H. T. E. KIRKPATRICK.